Figures 1, 2:
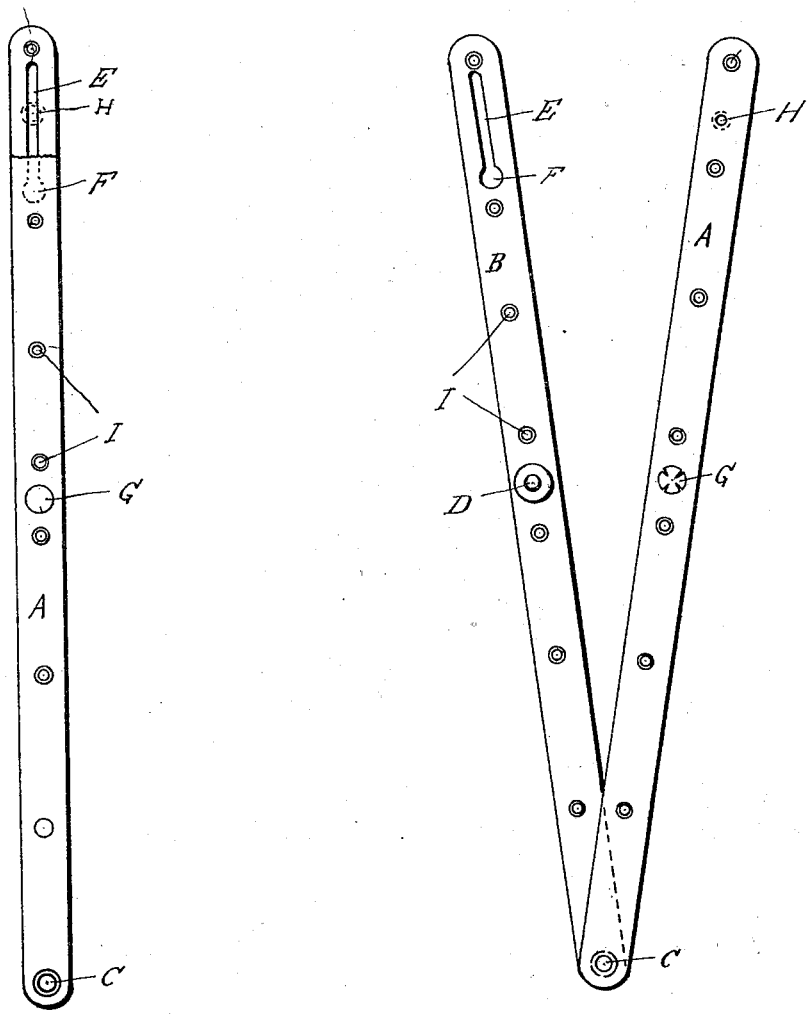

No. 722,009. PATENTED MAR. 3, 1903.
L. A. GILPATRICK.
PLACKET FASTENER.
APPLICATION FILED OCT. 6, 1900.
NO MODEL.

Witnesses.  Inventor.

UNITED STATES PATENT OFFICE.

LUVILLE ANDREW GILPATRICK, OF GORHAM, MAINE.

PLACKET-FASTENER.

SPECIFICATION forming part of Letters Patent No. 722,009, dated March 3, 1903.

Application filed October 6, 1900. Serial No. 32,221. (No model.)

*To all whom it may concern:*

Be it known that I, LUVILLE ANDREW GILPATRICK, a citizen of the United States, residing at Gorham, in the county of Cumberland and State of Maine, have invented certain new and useful Improvements in Placket-Fasteners; and I do hereby declare the following to be a full, clear, and exact description of the invention, such as will enable others skilled in the art to which it appertains to make and use the same.

My invention relates to improvements in placket-fasteners, the object being to provide a simple, sure, and direct means of closing and keeping closed the placket-opening in dress-skirts.

To this end it consists of two members pivoted near their lower ends and provided with locking means at the other end and at the center.

It further consists in means for allowing one of the members to slide upon the other vertically when the members are in their locked and closed position should the holder be bent or made to conform to the figure of the wearer.

In the drawings herewith accompanying and forming a part of this application, Figure 1 is a perspective view, partly broken away, showing my improved placket-fastener in a closed position. Fig. 2 is a perspective view showing the placket-fastener opened.

Same letters of reference refer to like parts in both the figures.

In said drawings, A and B represent the two members composing the placket-fastener, pivoted, as at C, in any suitable manner, so that the members may move one upon the other. Said member B is provided with a locking-stud D about midway of its length. At the upper extremity of said member B is an elongated opening E, provided with a substantially circular enlargement F at its lower extremity. The member A is also provided with a socket G about midway of its length, adapted when the said member A is superimposed on the member B to receive the stud D and to serve as additional means for locking the two members together. Near its upper or free end member A is provided a headed stud H, the head of said stud being of greater diameter than the width of the elongated opening in the said member B, the purpose of this being to lock the two members together when said lug has been inserted within the elongated opening E. The diameter of the circular opening in the member B is substantially of the same diameter as that of the head of the stud H, so as to allow said stud to be easily and readily inserted therein. The respective members of the placket-fastener are also provided with circular openings I, so that the said members may be easily sewed or fastened within or to the hem of the placket-opening.

It will be seen that by constructing my placket-fastener as herein described—that is, by providing one of the members with an elongated opening and the other with a stud, the position of the stud being such that when the respective members are closed and in their normal position and it is inserted within the slot it will be about half-way distant from either extremity thereof, as fully shown in Fig. 1—this will allow the stud H when the fastener is bent to render within the slot and to further prevent the members from swinging apart at the center and causing the placket to be forced open.

The advantages of my improved placket-fastener are that it is simple, easily affixed to the placket-opening in the dress-skirt, and not liable to be accidentally opened by the person sitting down or by any other unusual strain or pressure on the skirt.

Having thus described my invention and its use, I claim—

1. A placket-fastener consisting of two members superimposed and pivotally connected at one end, the free end of one member provided with a vertically-disposed slot having an enlargement at one end and the free end of the other member provided with a locking headed stud adapted to enter said vertical slot and hold said free ends movably joined together, said headed stud normally positioned midway the ends of said slot, whereby the free end of one member may slide freely by the free end of the other member.

2. In a placket-fastener, in combination, two members pivoted together at one end, the free end of one member provided with a vertically-disposed slot and the free end of the other member provided with a locking headed stud, said stud when said members are superimposed being adapted to enter said vertically-disposed slot and hold said free ends movably joined together, said headed stud normally positioned midway the ends of said slot, whereby the free end of one member may slide freely by the free end of the other member, and means for further locking said members at a point intermediate their ends.

In testimony whereof I affix my signature, in presence of two witnesses, this 24th day of September, 1900.

LUVILLE ANDREW GILPATRICK.

Witnesses:
NATHAN CLIFFORD,
ERNEST O. CHELLIS.